US008206026B2

(12) United States Patent
Wong

(10) Patent No.: US 8,206,026 B2
(45) Date of Patent: *Jun. 26, 2012

(54) FOOD FLIPPING AND TURNING APPARATUS

(76) Inventor: Don M. Wong, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,167

(22) Filed: Oct. 18, 2011

(65) Prior Publication Data

US 2012/0031284 A1 Feb. 9, 2012

Related U.S. Application Data

(63) Continuation of application No. 11/469,721, filed on Sep. 1, 2006, now Pat. No. 8,066,427.

(60) Provisional application No. 60/804,469, filed on Jun. 12, 2006.

(51) Int. Cl.
*A47J 43/07* (2006.01)

(52) U.S. Cl. ........... 366/276; 366/279; 366/309; 99/348

(58) Field of Classification Search .................... 99/348; 426/519; 366/64, 65, 67, 96–99, 276–282, 366/309, 312, 313

See application file for complete search history.

(56) References Cited

U.S. PATENT DOCUMENTS

| | | | |
|---|---|---|---|
| 2,758 | A | 8/1842 | Lindley |
| 2,993 | A | 3/1843 | Lindley et al. |
| 50,025 | A | 9/1865 | Myer, Jr. |
| 53,148 | A | 3/1866 | Humphrey |
| 54,597 | A | 5/1866 | Quick |
| 88,612 | A | 4/1869 | Crittenden |
| 89,934 | A | 5/1869 | Long |
| 101,423 | A | 4/1870 | Boon et al. |
| 144,225 | A | 11/1873 | Purple |
| 149,521 | A | 4/1874 | Poulson |
| 172,693 | A | 1/1876 | Blair |
| 218,121 | A | 8/1879 | Hunter |
| 281,364 | A | 7/1883 | Henry |

(Continued)

FOREIGN PATENT DOCUMENTS

| | | | |
|---|---|---|---|
| DE | 3247495 | A1 | 6/1984 |

(Continued)

OTHER PUBLICATIONS

International Search Report and Written Opinion for PCT/US07/70202 mailed on Dec. 4, 2007.

*Primary Examiner* — Charles E Cooley

(74) *Attorney, Agent, or Firm* — James F. Hann; Haynes Beffel & Wolfeld LLP

(57) ABSTRACT

A cooking apparatus includes a spatula assembly and a cooking container comprising an upper access opening and an inner, cooking surface having a spherical surface portion. The spatula assembly includes a spatula driver and a curved spatula pivotally mounted to the cooking container for moving along the cooking surface and about a pivot axis between first and second positions. The pivot axis passes through the center point of the spherical surface portion. The spatula assembly may be constructed so that at least one of the first and second positions is above the pivot axis. The curved spatula may also include a spatula body having an outer surface and a barrier member extending radially inwardly from the outer surface, the outer surface contacting the cooking surface of the cooking container.

28 Claims, 21 Drawing Sheets

U.S. PATENT DOCUMENTS 290,033 A 12/1883 Ginn
318,786 A 5/1885 Newcomber
360,579 A 4/1887 Freund
491,008 A 1/1893 Burns
534,377 A 2/1895 Sceets
534,378 A 2/1895 Sceets
603,537 A 5/1898 Pearson
629,802 A 8/1899 Moore
683,474 A 10/1901 MacKinzie
690,254 A 12/1901 Enzler
741,586 A 10/1903 Maurer
841,310 A 1/1907 Carlson
1,115,009 A 10/1914 Ostdiek et al.
1,158,188 A 10/1915 Doyle
1,185,856 A 6/1916 Talbert
1,212,585 A 1/1917 Toda
1,430,012 A 9/1922 Heiser
1,453,604 A 5/1923 Repath
1,752,833 A 4/1930 Brumder
2,004,446 A 6/1935 Mills
2,055,394 A 9/1936 Thomas
2,090,954 A 8/1937 Stenvers
2,513,254 A 6/1950 Savage et al.
2,585,767 A 2/1952 Guggenheim et al.
2,753,158 A 7/1956 Rebechini
2,869,840 A 1/1959 Schmidt
2,879,043 A 3/1959 Schmidt
2,905,452 A 9/1959 Appleton
3,357,685 A 12/1967 Stephens
3,635,147 A 1/1972 Lee
3,739,710 A 6/1973 Costa et al.
3,752,057 A 8/1973 Groen, Jr.
3,783,770 A 1/1974 Aries
3,884,135 A 5/1975 Lohr et al.
3,949,659 A 4/1976 Hunt
4,179,221 A 12/1979 Lucke
4,196,342 A 4/1980 Chailloux
4,197,018 A 4/1980 Groen, Jr.
4,199,266 A 4/1980 Giusti
4,339,992 A 7/1982 Kurland
4,395,133 A 7/1983 Clevenholm et al.
4,469,445 A 9/1984 Wurtz
4,503,502 A 3/1985 Chapin
4,525,072 A 6/1985 Giusti
4,571,091 A 2/1986 Pardo et al.
4,649,810 A 3/1987 Wong
4,700,617 A 10/1987 Lee et al.
4,706,558 A 11/1987 Snyder, Jr.
4,721,036 A 1/1988 Brandt et al.
4,790,667 A 12/1988 Pardo et al.
4,818,116 A 4/1989 Pardo et al.
4,820,054 A 4/1989 Wong
4,821,631 A 4/1989 Wong et al.
4,854,717 A 8/1989 Crane et al.
4,856,910 A 8/1989 Cuschera
4,907,502 A 3/1990 Snyder, Jr.
4,919,950 A 4/1990 Mak
4,942,807 A 7/1990 Wong
4,952,069 A 8/1990 Boulard
4,959,517 A 9/1990 Jump et al.
5,022,315 A 6/1991 Bertram et al.
5,027,697 A 7/1991 De Longhi
5,050,490 A 9/1991 Yahav et al.
5,070,222 A 12/1991 Yahav et al.
5,095,812 A 3/1992 Yahav et al.
5,176,069 A 1/1993 Chen
5,228,381 A 7/1993 Virgilio et al.
5,259,300 A 11/1993 Yajima
5,271,673 A 12/1993 Bohnet et al.
5,339,997 A 8/1994 Billivant et al.
5,353,696 A 10/1994 Stadelmann et al.
5,421,651 A 6/1995 Pickering et al.
5,460,506 A 10/1995 Price, IV et al.
5,535,665 A 7/1996 Wong
5,547,279 A 8/1996 Spitzer Sr.
5,568,976 A 10/1996 Gabriele
5,613,425 A 3/1997 Krznaric
5,613,774 A 3/1997 Chandra et al.
5,615,951 A 4/1997 Gabriele
5,617,774 A 4/1997 LaVelle et al.
5,626,073 A 5/1997 Bauer
5,711,602 A 1/1998 Rohring et al.
5,791,777 A 8/1998 Mak
5,890,804 A 4/1999 Edwards et al.
5,911,811 A 6/1999 Muntener
6,026,735 A 2/2000 Waterworth
6,077,555 A 6/2000 Dotan
6,112,645 A 9/2000 Chang
6,186,055 B1 2/2001 DeMars et al.
6,331,323 B1 12/2001 Adler-Nissen et al.
6,499,391 B1 12/2002 Su
6,629,491 B1 10/2003 Chan
6,647,864 B1 11/2003 Fang
6,843,166 B1 * 1/2005 Li .................................. 99/327
6,866,413 B2 3/2005 Donthnier et al.
6,927,366 B2 8/2005 Sawhney et al.
6,932,503 B2 8/2005 Fallowes
6,933,484 B2 8/2005 Lindley et al.
6,948,422 B1 9/2005 Nagasaki
7,011,013 B2 3/2006 Leason
7,231,872 B2 6/2007 Babicz
7,270,473 B2 9/2007 Donthnier et al.
7,485,830 B2 2/2009 Wang
7,585,105 B2 9/2009 Reinecke
8,066,427 B2 * 11/2011 Wong ............................ 366/276
2004/0103795 A1 6/2004 McLemore
2004/0145965 A1 7/2004 Chan et al.
2004/0159244 A1 8/2004 Leason
2005/0034611 A1 2/2005 McLemore
2005/0276892 A1 12/2005 McLemore
2006/0278095 A1 12/2006 Saunders et al.
2007/0006738 A1 1/2007 Beesley
2007/0286017 A1 12/2007 Wong
2008/0134905 A1 6/2008 Peng
2008/0190301 A1 8/2008 Peng
2008/0202348 A1 8/2008 Liu
2008/0289510 A1 11/2008 Liu
2010/0012639 A1 1/2010 Merrell et al.
2012/0031284 A1 * 2/2012 Wong ............................. 99/352
2012/0034362 A1 * 2/2012 Wong ............................ 426/523

FOREIGN PATENT DOCUMENTS

GB 2194460 A 3/1988

* cited by examiner

FOOD FLIPPING AND TURNING APPARATUS

CROSS-REFERENCE TO OTHER APPLICATIONS

This application is a continuation of U.S. patent application Ser. No. 11/469,72 filed 1 Sep. 2006 and entitled Stirring And Mixing Apparatus (now U.S. Pat. No. 8,066,427), which claims the benefit of U.S. provisional patent application No. 60/804,469 filed 12 Jun. 2006 and entitled Mixing and Stirring Apparatus, the disclosures of which are incorporated by reference.

BACKGROUND OF THE INVENTION

Automated cooking machines, such as bread makers, have become increasingly popular. Another type of automated cooking machine is shown in U.S. Pat. Nos. 4,649,810; 4,779,522; 4,820,054; 4,942,807, all issued to the present inventor, the disclosures of which are incorporated by reference. This type of automated cooking machine permits ingredients to be added at different times, stirred and turned or flipped. One way to implement a stirring action is to use a simple planar stirrer to scrape the bottom of the pot in a circular fashion. The shape of the stirrer will cause the food ingredients to spread out or tumble over the top of the stirrer. However, the overall action is not a true turn and flip motion so that its effectiveness is compromised in many situations.

The two-axis turn and flip stirrer disclosed in, for example, U.S. Pat. No. 4,942,807 is an automated stirrer which will perform a true turn and flip function. However, in certain situations even the stirrer shown in this patent is not as effective as could be desired. This can occur when cooking a relatively small amount of an ingredient or when the cooking surface is extremely slippery, as could be caused by non-stick surface coating or the presence of a sufficient amount of water, oil or other liquid. In these situations, the stirrer can have a tendency to push the ingredients forward rather than turning and flipping the ingredients. The slippage will render the two-axis stirrer less effective than it is designed to be. Therefore, an effective two-axis stirrer also depends on sufficient surface friction developed at least in part by the total weight of the ingredients to be pushed, turned and flipped.

To solve the problem of ingredients being pushed forward rather than turning, the present inventor came up with another design disclosed in U.S. Pat. No. 5,535,665. An obstruction or blocking element was introduced to create a blocking motion to prevent the ingredient from being pushed forward by the turning spatula. The accumulation of blocked ingredients allowed the spatula to turn and flip the ingredients more effectively. If the ingredients are small relative to the size of the spatula, turning and flipping will be effective. If the thickness of the ingredients is larger than the width of the spatula, the turning will be less effective. Also thin and long ingredients such as noodles have tendency to whirl and tangle around the stirrer. Another occasional problem is food jammed between the spatula and the bottom of the cooking container or the obstruction element. Jamming can occur for several reasons. For example, an edge of the spatula might get caught on top of a large hard ingredient. While the drive mechanism can be clutched to prevent damage the machine, a very elaborate gearing and clutching arrangement may be necessary to release the jammed condition. Even so there will still be a small chance the food cannot be freed and require operator intervention. The stirrer assembly itself involves angle turning gears, shafts, a wiper and a spatula; it requires disassembly for cleaning and assembly for cooking.

BRIEF SUMMARY OF THE INVENTION

A first embodiment of the present invention is a cooking apparatus including a cooking container comprising an upper access opening and an inner, cooking surface. The cooking surface includes a spherical surface portion defining a center point. The cooking surface also defines an open interior extending inwardly from the access opening. The cooking apparatus also includes a spatula assembly. The spatula assembly includes a curved spatula pivotally mounted to the cooking container for moving along the cooking surface and about a pivot axis between first and second positions. The pivot axis passes through the center point. The spatula assembly also includes a spatula driver operably coupled to the spatula to drive the spatula between the first and second positions. The spatula assembly may be constructed so that at least one of the first and second positions is above the pivot axis. The curved spatula may also include a spatula body having an outer surface and a barrier member extending radially inwardly from the outer surface, the outer surface contacting the cooking surface of the cooking container.

One example of a cooking method carried out according to the present invention comprises heating a cooking container and stirring food within an open interior of the cooking container. The heating step is carried out with a cooking container comprising an upper access opening and a cooking surface, the cooking surface comprising a spherical surface portion defining a center point, the cooking surface defining an open interior extending inwardly from the access opening. The food stirring step comprises moving a curved spatula along the cooking surface about a pivot axis between first and second positions, the pivot axis passing through the center point; and turning food over before or as the spatula reaches the first position. The moving step may be carried out with the spatula body being in continuous close contact with the cooking surface until the spatula has passed the access opening.

Other features, aspects and advantages of the present invention can be seen on review of the figures, the detailed description, and the claims which follow.

DETAILED DESCRIPTION OF THE INVENTION

Figure 1:
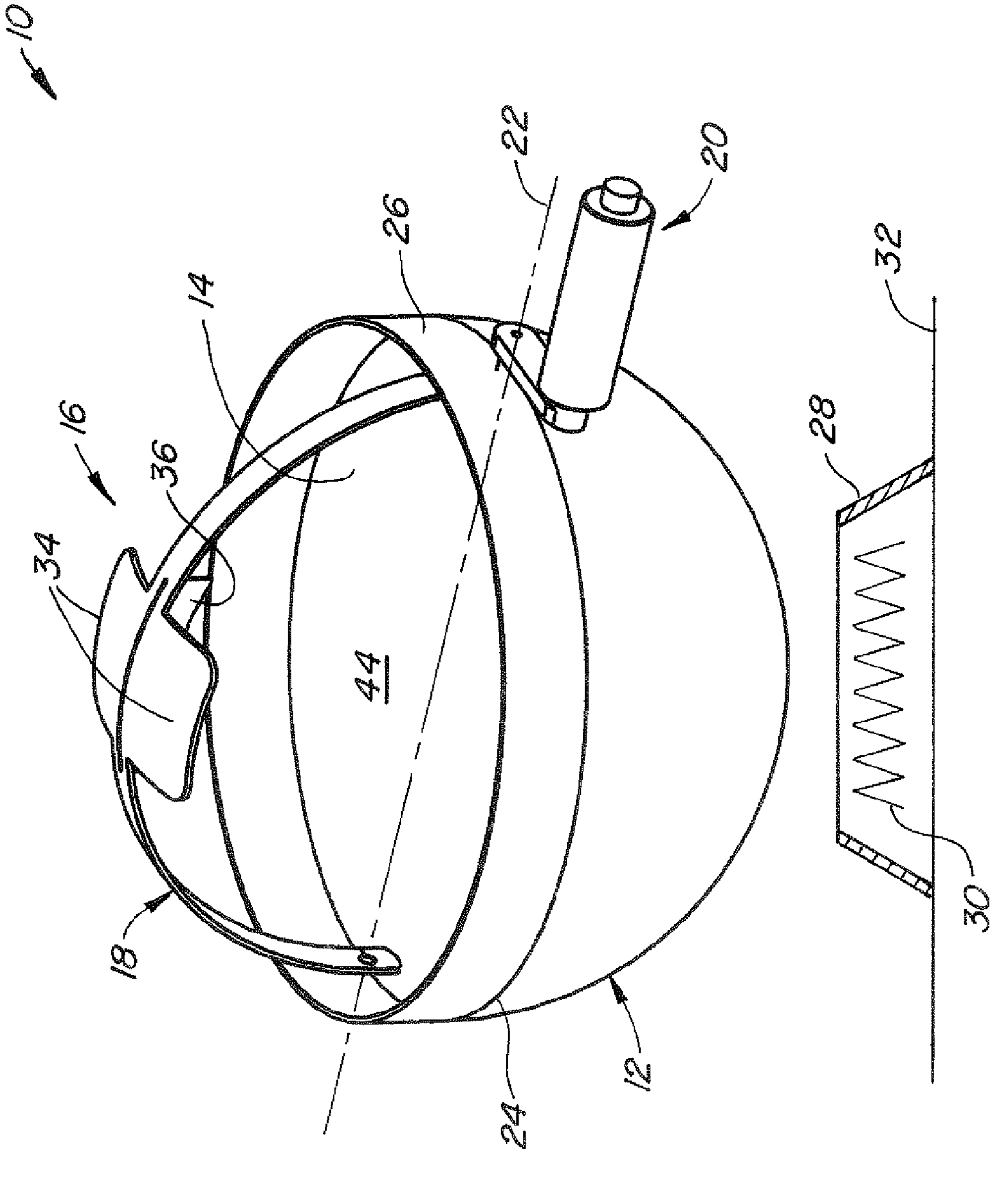
FIG. 1 illustrates a cooking apparatus made according to the invention situated above a support ring on a stovetop.

The following description of the invention will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 illustrates the first embodiment of a cooking apparatus 10 made according to the invention. Cooking apparatus 10 includes a cooking container 12, having an inner surface 14, and a spatula assembly 16. Spatula assembly 16 comprises a spatula 18 and a spatula driver 20. Spatula driver 20 drives spatula 18 for movement about a pivot axis 22. Pivot axis 22 is located at the upper edge 24 of cooking container 12. A spill ring 26 is mounted to and extends upwardly from upper edge 24. The wall of the spill ring 26 can be cylindrical, or section of a half sphere with a radius equal or slightly larger than cooking container 12. The curved inner surface of a spherical spill ring can accelerate the falling back of ingredients into cooking container 12. Another advantage of spill ring 26 is one of safety; it can help protect the operator from contacting spatula 18 or being caught between the spatula and cooking container 12 during its rotating motion.

In the embodiment of FIG. 1 cooking container 12 is similar to a wok but with inner surface 14 being hemispherical. Cooking container 12 is typically used with a support ring 28 to support cooking apparatus 10 above, for example, a heat source 30 on a stove top 32. In some embodiments a heating element can be welded or otherwise affixed to the bottom of cooking container 12. Spatula 18 is a curved spatula having a radius of curvature equal to or slightly less than the radius of curvature of inner surface 14. The central portion of spatula 18 includes circumferentially-extending curved wings 34 and a radially inwardly extending barrier member 36. The length and width of curved wings 34 as well as the length and height of barrier member 36 can be varied according to the operating environment, including the amount and type of food it to be prepared. In some embodiments the thickness of spatula 18 may be sufficient to eliminate the need for one or both of curved wings 34 and barrier member 36.

Figure 2A:
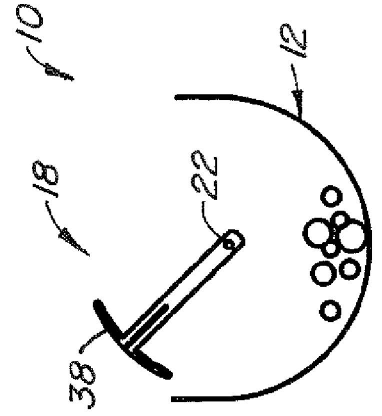
FIGS. 2A-2D are simplified cross-sectional views of the cooking apparatus of FIG. 1 illustrating a single mixing cycle for the spatula assembly.
Figure 2B:
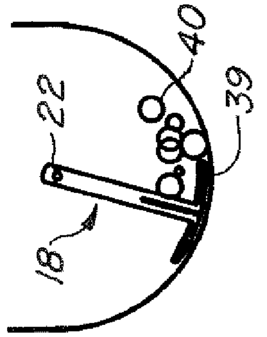
Figure 2C:
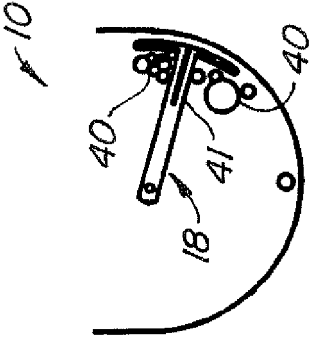
Figure 2D:
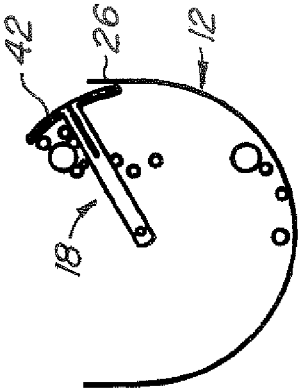

FIGS. 2A-2D are simplified cross-sectional views of cooking apparatus 10 showing a single cycle of spatula assembly 16. FIG. 2A shows spatula 18 at a first position 38 above pivot axis 22. FIG. 2B shows spatula 18 at a second position 39 as it begins to engage food or other ingredients 40. FIG. 2C shows the continued movement of spatula 18 to a second position 41 showing some of food 40 still being supported and moved by spatula 18 while the rest of food 40 has begun falling away from spatula assembly 18. Third position 42, see FIG. 2D, is located above axis 22 so to allow food 40 to be released from spatula 18 and fall back into the open interior 44 of cooking container 12. Spatula 18 may be operated to continue the counterclockwise movement of the path shown in FIG. 2 so to return back to first position 38. Alternatively, and typically preferably, spatula 18 is then rotated in a clockwise direction from third position 42 through second positions 41, 39 and to first position 38 in an oscillating or reciprocating manner.

As spatula 18 rotates, the spatula scraps the total inner surface 14 of cooking container 12, and temporarily loosens food 40 or other ingredients from the cooking container. When spatula 18 is scooping up ingredients from the middle portion of cooking container 12, it creates an opening and allows other ingredients from both sides of curved inner surface 14 to fill the opening. This constant displacement of ingredients helps to create improved mixing of the ingredients.

The movement of spatula 18 is typically to a position above pivot axis 22 to help ensure the proper mixing and turning of food 40. However, spatula 18 can be configured in a manner to cause food to be flipped or turned before reaching pivot axis 22. One way could be to make barrier member 36 wedge-shaped or drive spatula 18 with an oscillating rotation motion. Another, more complicated and therefore possibly less desirable, way to do so could be to cause one or more of barrier member 36 to flip or rotate downwardly at an appropriate position along the path of spatula 18.

Figure 3:
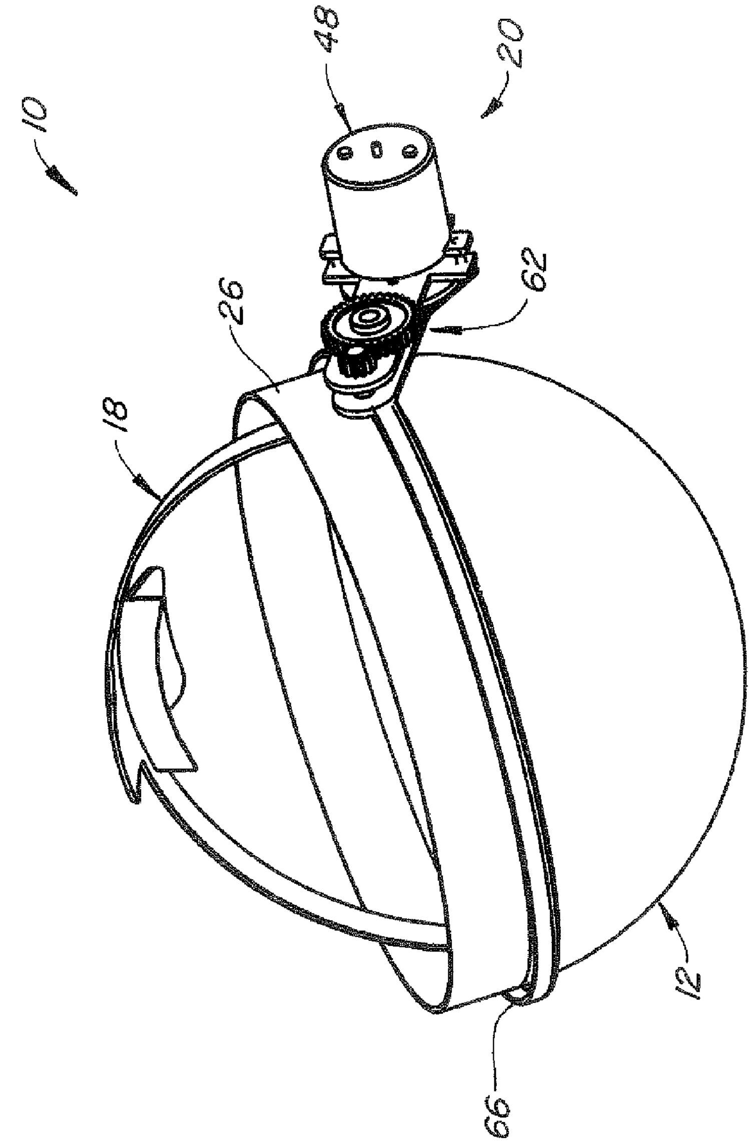
FIG. 3 illustrates an alternative embodiment of the cooking apparatus of FIG. 1 using a motorized spatula driver.
Figure 4:
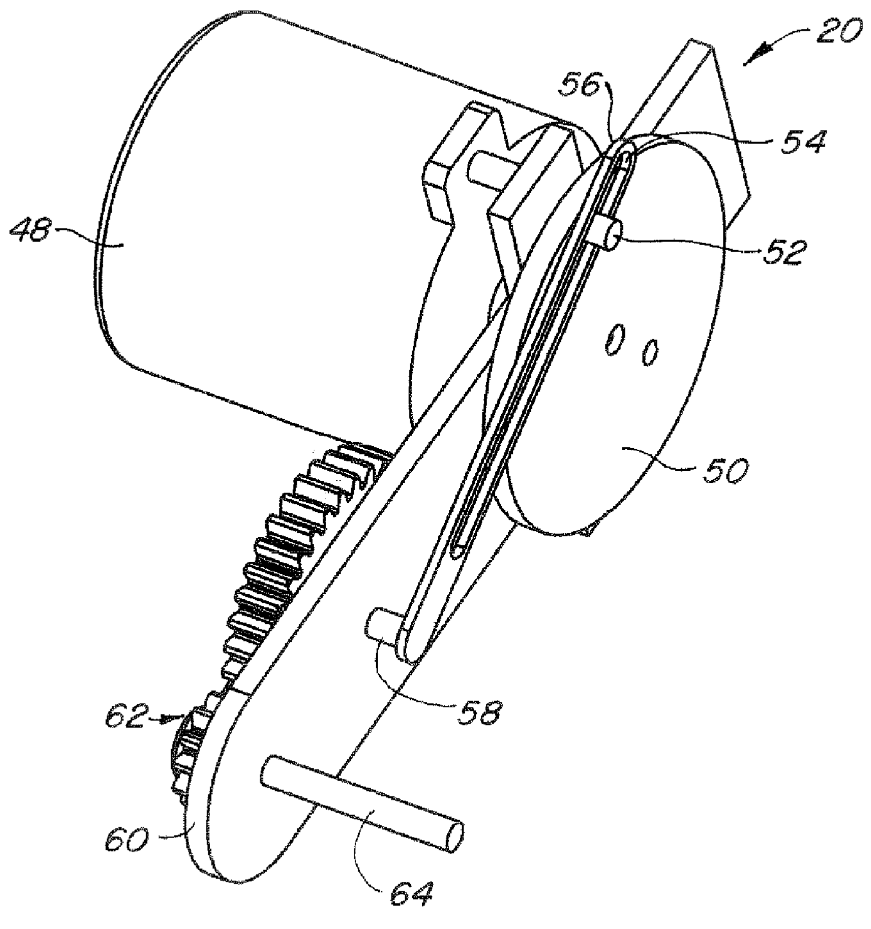
FIG. 4 is an enlarged view of the motorized spatula driver of FIG. 3.

FIG. 3 illustrates cooking apparatus 10 similar to that of FIG. 1 but including a motorized spatula driver 20, shown also in FIG. 4. Motorized spatula driver 20 includes a motor 48 driving a wheel 50. Wheel 50 has a pin 52 passing through a slot 54 in a pivot arm 56. The other end of pivot arm 56 is secured to a pivot shaft 58 passing through a support plate 60. Pivot shaft 58 is connected to and drives a gear train 62 on the opposite side of support plate 60. Gear train 62 drives an output drive shaft 64 passing through support plate 60. Output drive shaft 64 is connected to one end of spatula 18 and drives the spatula in a reciprocating or oscillating manner. Similar oscillating motion can be achieved by using an electronically controlled reversible motor.

Figure 5:
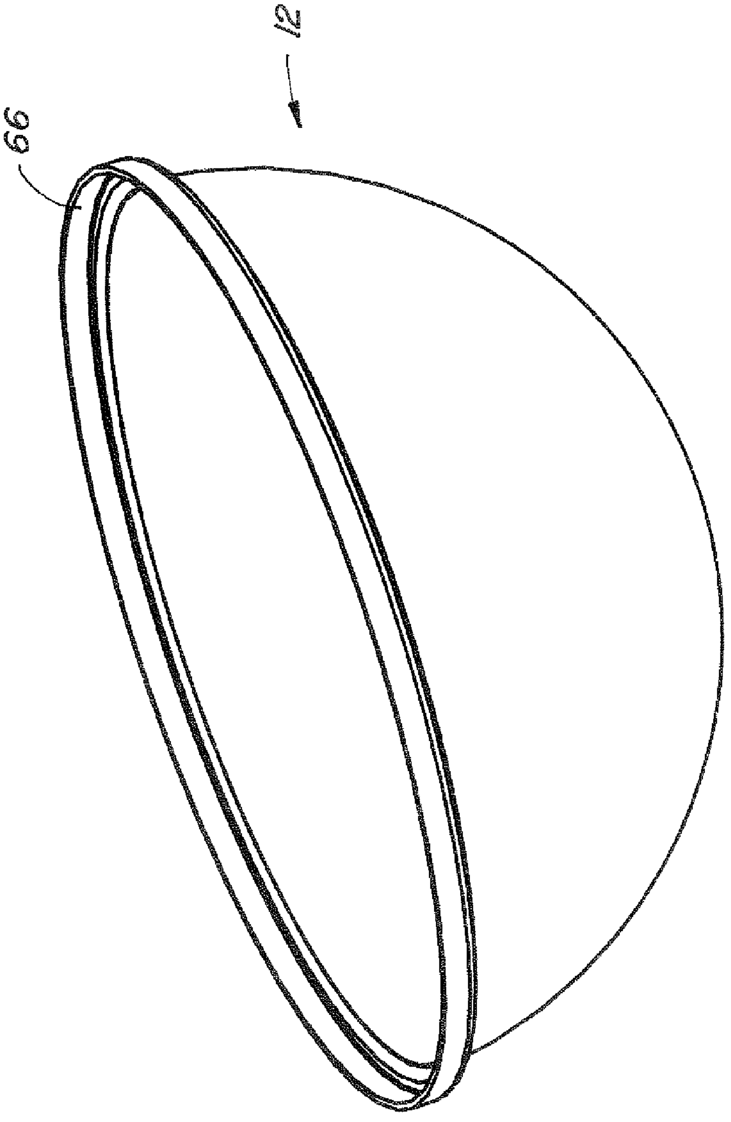
FIG. 5 shows an alternative embodiment of the cooking container of FIG. 1.
Figure 6:
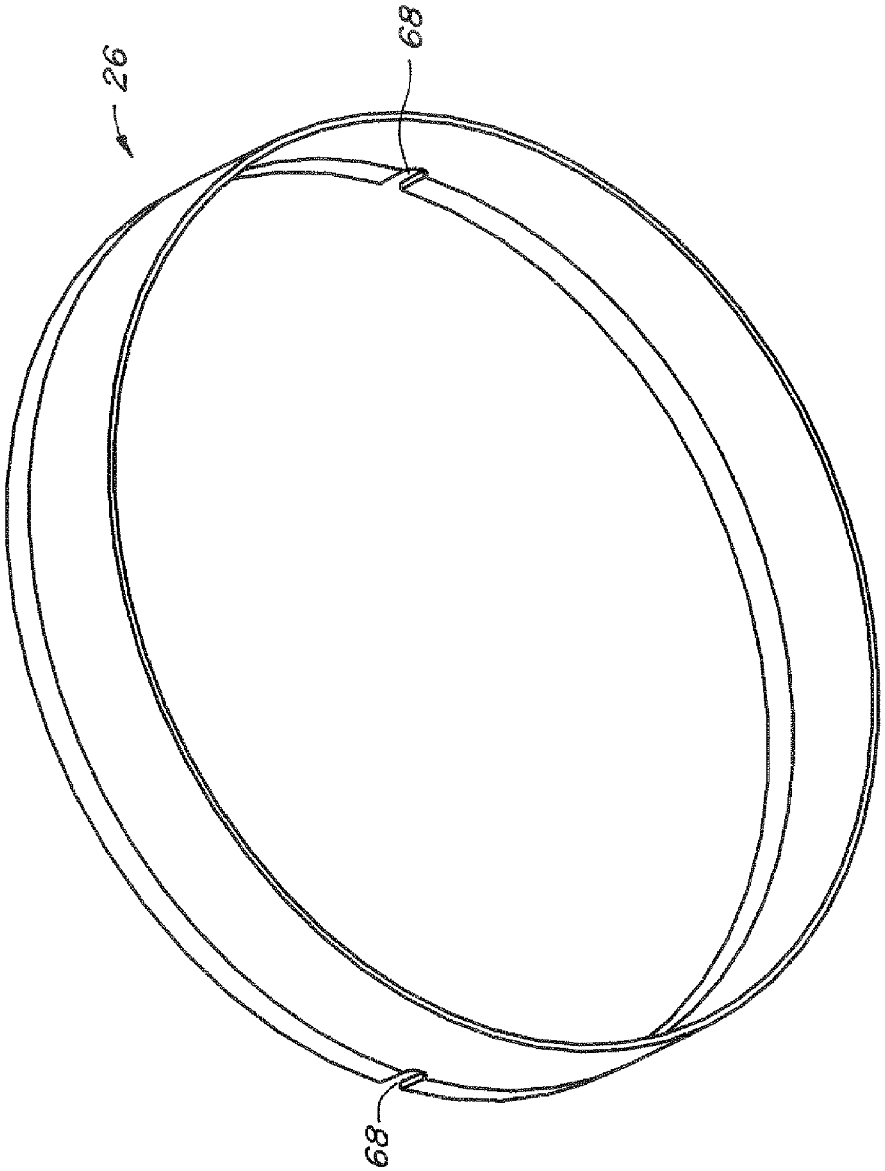
FIG. 6 illustrates a separate spill ring used with the cooking container of FIG. 5.

Another distinction between cooking apparatus 10 of FIG. 3 and cooking apparatus 10 of FIG. 1 is that cooking container 12 and spill ring 26 are separate components in the FIG. 3 embodiment while in the FIG. 1 embodiment spill ring 26 is an integral extension of cooking container 12. Cooking container 12 of FIGS. 3 and 5 includes a drip lip 66 to accommodate mounting spill ring 26. Drip lip 66 also helps prevent drips running down the outer surface of spill ring 26 from continuing down onto the outside of cooking container 12, where they could be burned on during cooking. In addition, the use of a full size curved body type of spatula 18, such as in FIGS. 7-8, plus the use of an amply sized drip lip 66 can help eliminate spillage and reduced the need for a spill ring. Spill ring 26 shown in FIG. 6 includes cut outs 68 to accommodate pivot pegs or pivot pins at either end of spatula 18. Spill ring 26 may be made of the same material as cooking container 12 but also may be made of other materials, such as high-temperature plastic materials or composite materials.

Figure 7:
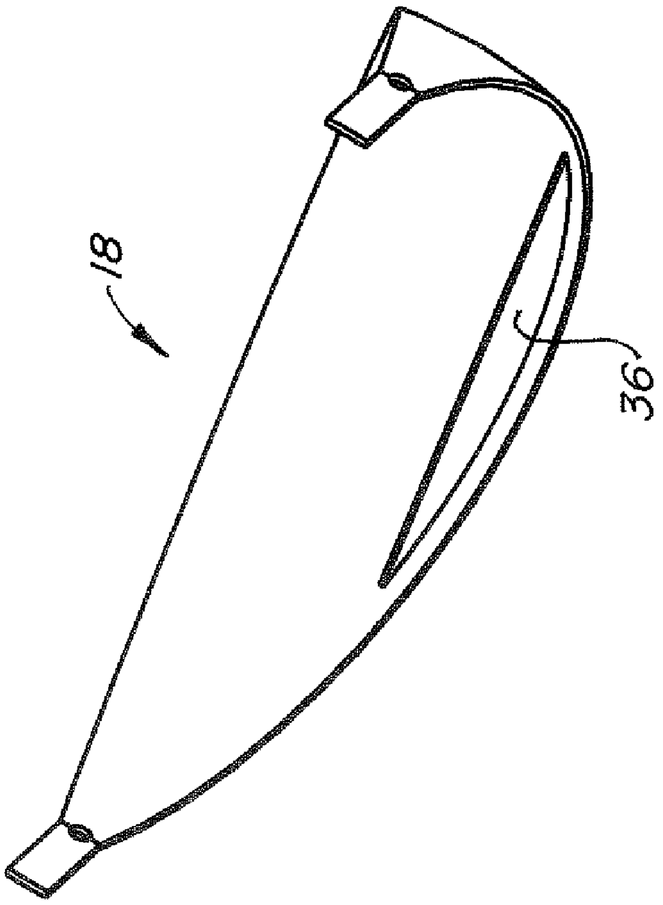
FIGS. 7, 8, 8A and 9-11 illustrate alternative embodiments of the spatula of FIG. 1, the FIG. 11 embodiment having a full-length barrier member.
Figure 8:
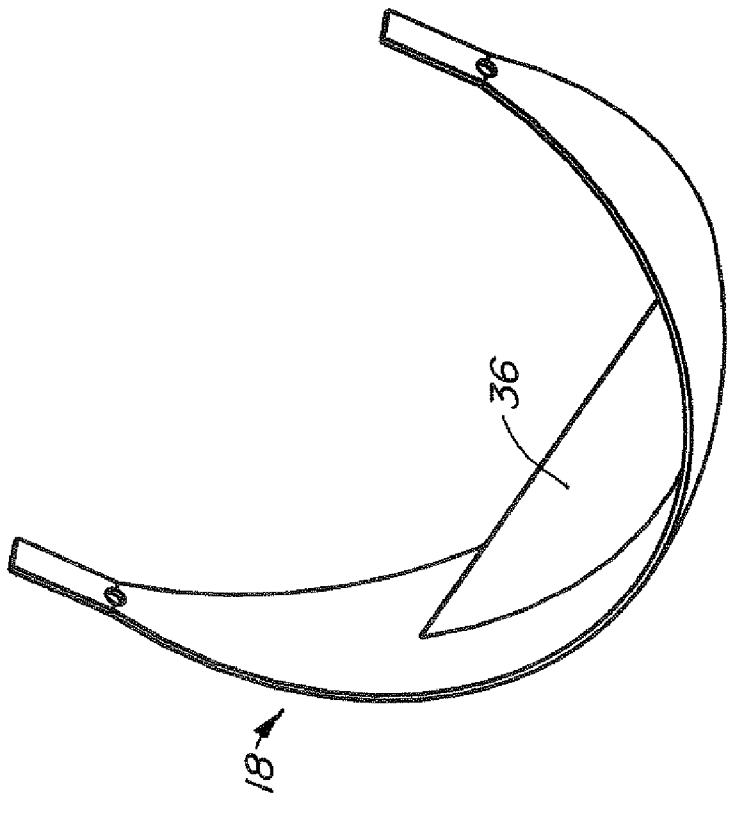

The height of spill ring 26 typically depends on the method of stirring, but usually is no more than the radius of the cooking container 12. Lower heights can usually be used if an oscillating spatula driver 20 is used to drive spatula 18 in an oscillating manner. In addition, lower height spill rings 26 can also be used when spatula 18 is driven manually and the operator uses an oscillating spatula motion as opposed to simply rotating the spatula 360° about the pivot axis. However, the particular type of food, the quantity of food and the shape and style of the spatula can also affect the necessary height or requirement for spill ring 26. A full body type of spatula as shown in FIGS. 7-8 can greatly reduced the need of a spill ring. If a removable cover or an ingredient dispensing system is used, such cover or ingredient dispensing system can be constructed to accommodate any height of spill ring.

Figure 8A:
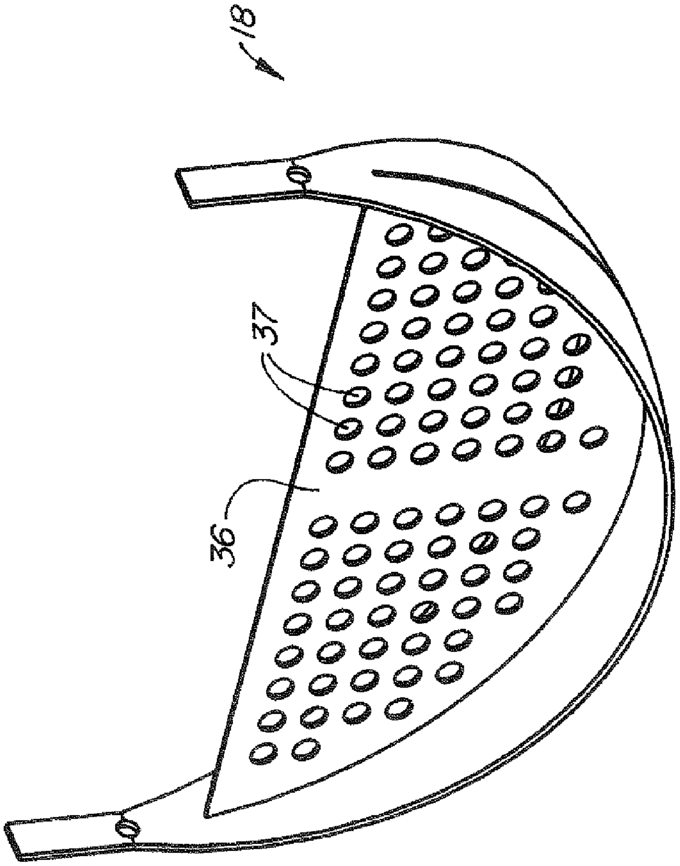
Figure 9:
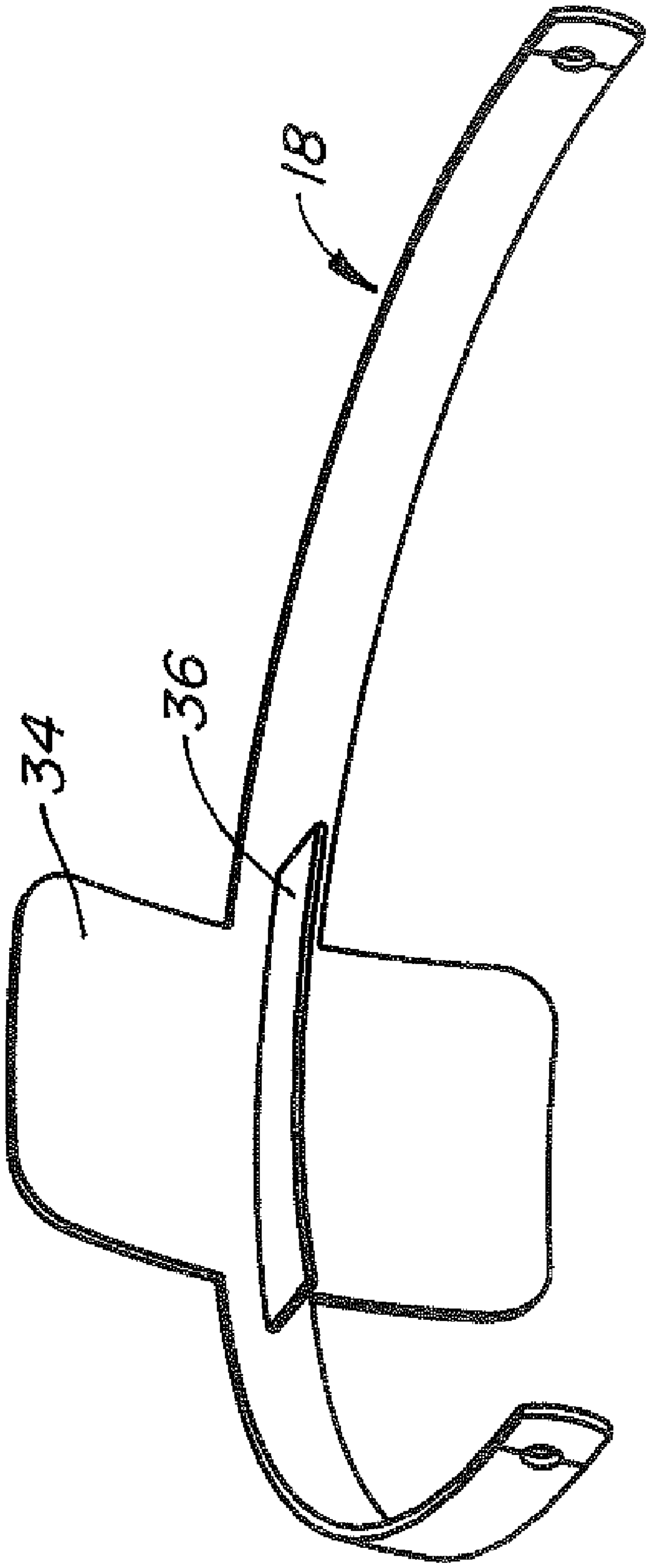
Figure 10:
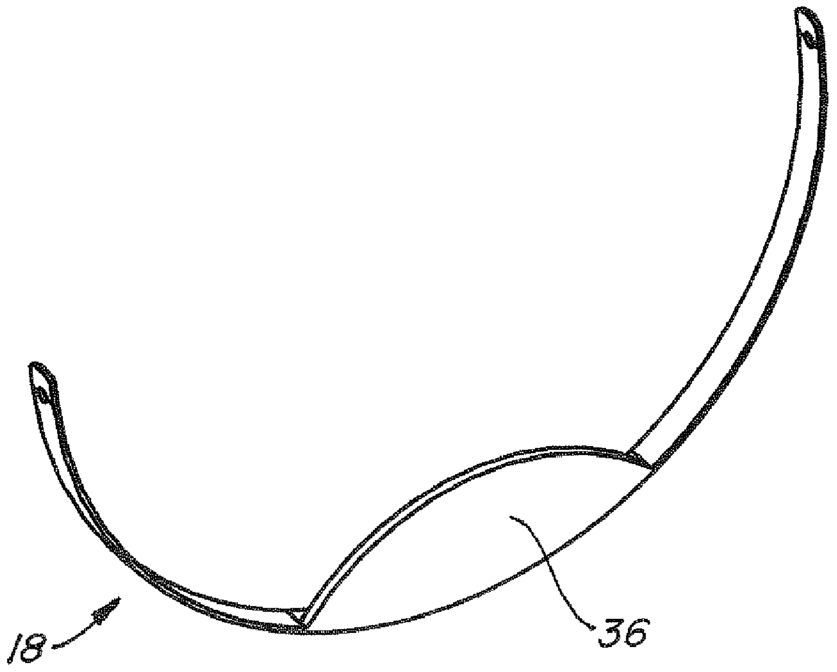
Figure 11:
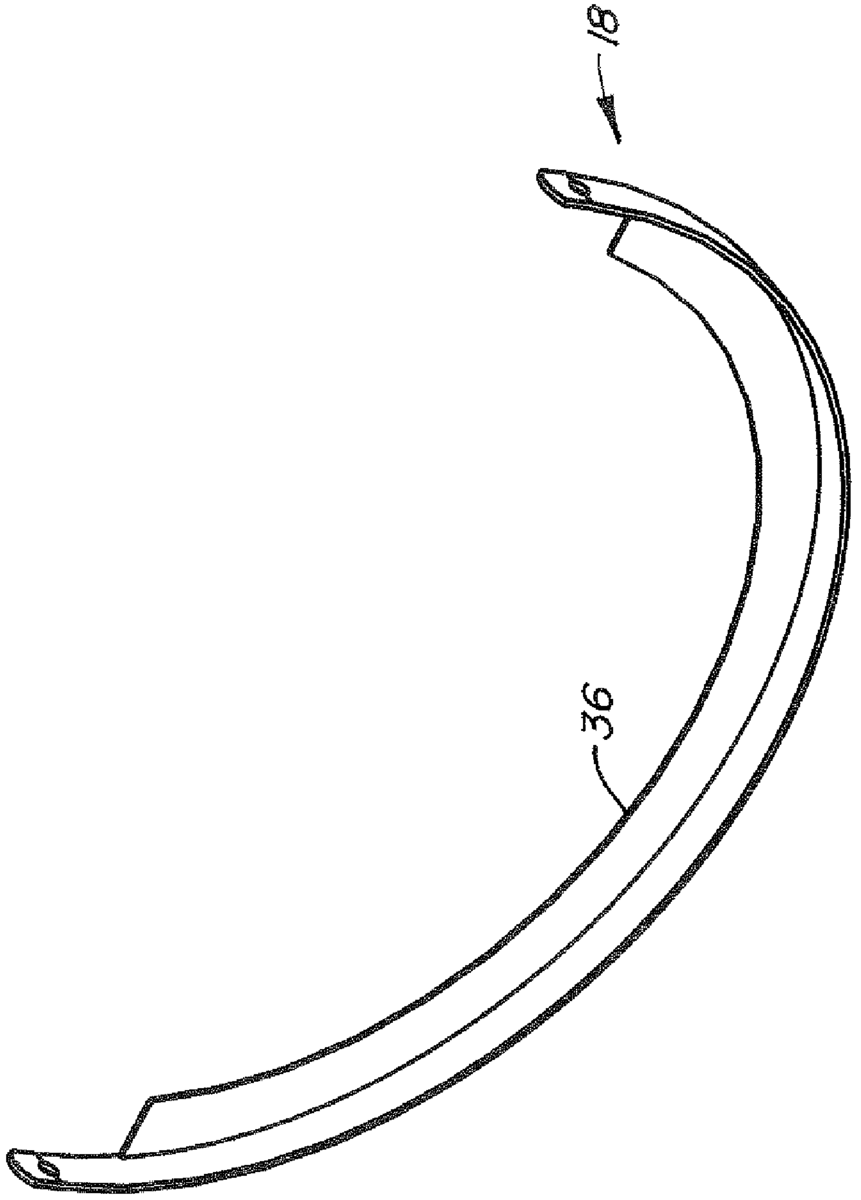

Assuming inner surface 14 of cooking container 12 is a section of a sphere, the body of spatula 18 is preferably circular in shape and concentric to pivot axis 22, with its radius slightly less than that of inner surface 14. Spatula 18 can be configured to look like, for example, a thin slice of the spherical sector of cooking container 12 (FIGS. 7, 8), or a circularly bent piece of elongate rectangular rod (FIGS. 9, 10) or a small round rod. A full (FIG. 11) or partial (FIGS. 7-10) barrier member 36, is provided for collecting and pushing ingredients. Different configurations of barrier member 36 have different turning and mixing effects so that the particular configuration for barrier member 36 will depend at least in part on the cooking requirements. For example, spatula 18 in FIG. 7 or 8 can be used to turn large portions of ingredients without first breaking up the portion in the middle and thus preserve the relative form and shape of the ingredients. Spatula 18 in FIG. 9 helps to break up the ingredients faster and caused a more thorough mixing. Wing 34 helps to prevent ingredients from spilling over the edge of cooking container 12 when it reaches upper edge 24. Since spatula in FIG. 9 is lifting a smaller portion of ingredient in each cycle, the amount of torque requirement to raise the ingredients is much less, and thus is suitable for manual and low torque motor configurations. FIG. 8A shows a spatula 18 with a barrier 36 perforated with drainage holes 37; this type of spatula can be used for cooking involving large amounts of liquid, such as deep frying, cooking noodles, etc. Holes 37 can separate the liquid and solid ingredients at the end of cooking cycle by raising spatula 18 to the upper edge of cooking container 12.

Spatula 18 typically rotates around pivot axis 22 passing through the center of the sphere partially formed by inner surface 14 of cooking container 12. The scrapping surfaces of spatula 18 and inner surface 14 of cooking container 12 are preferably concentric and in constant close contact. The angle of entry for the spatula to collect and push the ingredients is close to the tangent line of the two curved surfaces formed by the pot and spatula. Because of this small clearance between spatula 18 and inner surface 14 the contact force on the food ingredients is controllable and the chance of jamming is greatly reduced.

The above embodiments have spherical inner surfaces 14. Other embodiments may use curved surfaces that are not spherical, such as spheroid, but still define a circular arc at each position along the axis. Other curved surfaces which do not define a circular arc at each position along the axis may be accommodated by providing a telescoping or other variable length spatula that can change its length as necessary so that it scrapes along the inner curved surface of the cooking container. Such a telescoping spatula would preferably have an inherent bias forcing it against the inner surface of the cooking container. In some situations merely providing a flexible spatula may accommodate curved surfaces which do not define a circular arc at each position along the axis.

Figure 12:
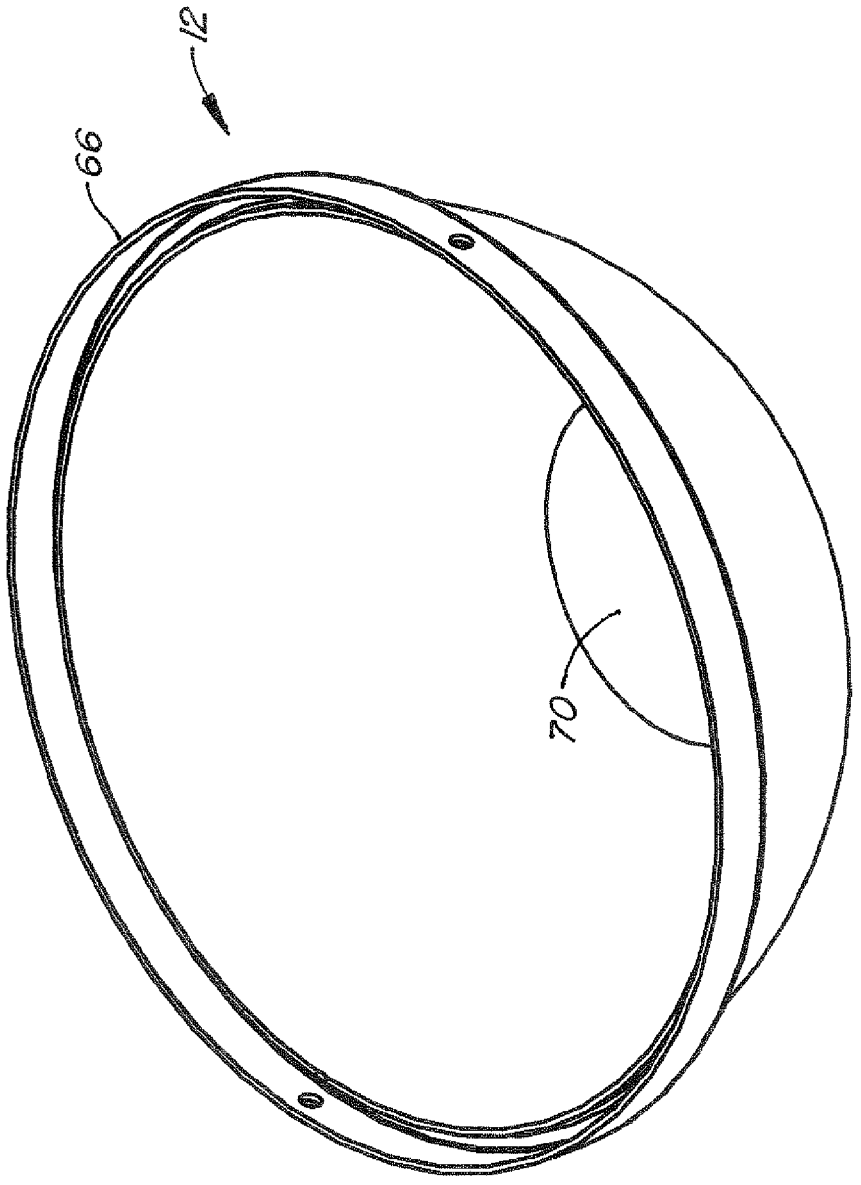
FIG. 12 shows a further embodiment of a cooking container including a flat area on the bottom.

For example, in some embodiments cooking container 12 may be a generally spherical cooking container with a relatively small flat bottom area 70, see FIG. 12, for stability on a flat heating surface. This type of cooking container may also be used with or without a spill ring 26. If flat bottom area 70 is relatively small, the small gap created between the inner surface 14 of cooking container 12 and spatula 18 during the rotation of the spatula may not affect the turning and mixing of food 40 in any significant matter. One reason for this is that ingredients have a tendency to push forward to displace other ingredients. One way to minimize the gap is to add a small rounded sector 72 with a spring arm 74 to accommodate the changing radius of rotation of the spatula; see FIG. 13. Another way to accommodate the flat bottom would be the use of a telescoping or other variable length spatula. Also, just a central portion of the spatula could be a telescoping and/or flexible spatula element so that as the central portion of the spatula begins contacting the flat area on the bottom, the spatula can continue to follow the contour of the inner surface of the cooking container along the entire length of the spatula.

Figure 13:
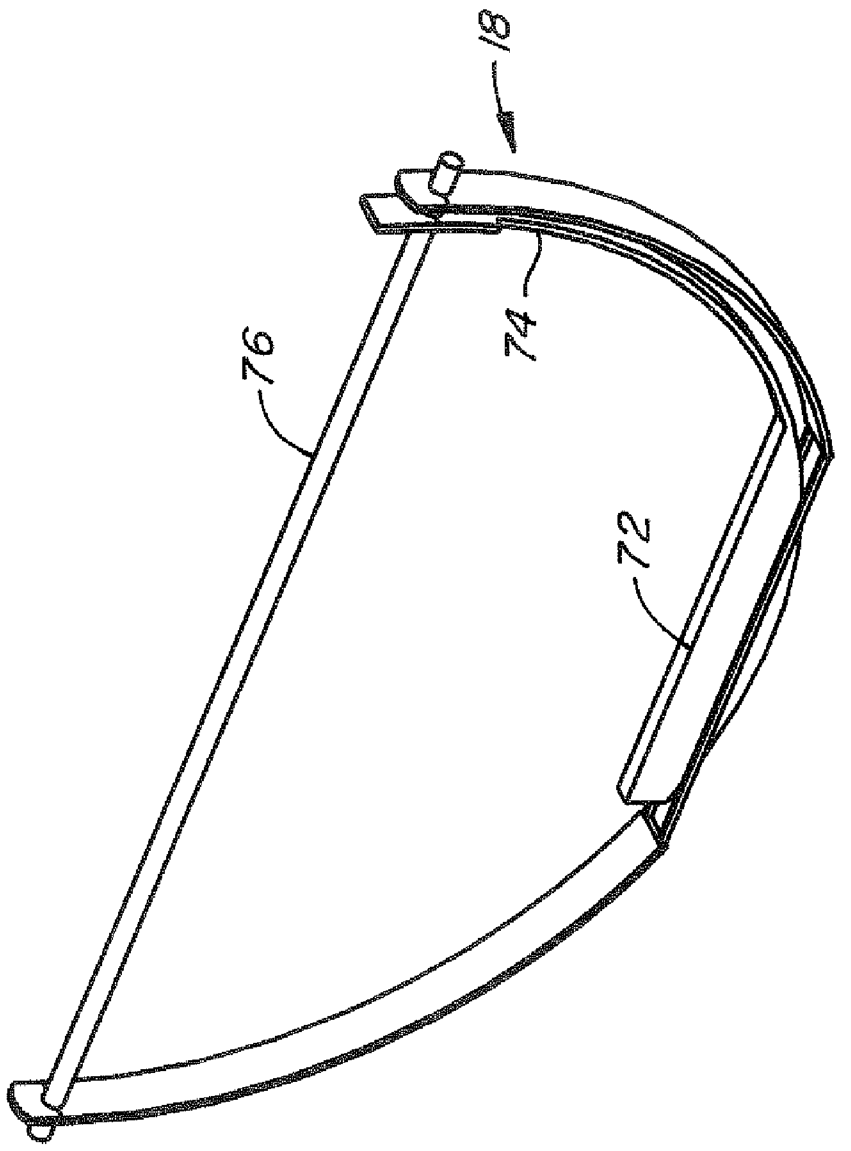
FIGS. 13 and 14 illustrate two types of spatulas designed for use with the cooking container of FIG. 12.
Figure 14:
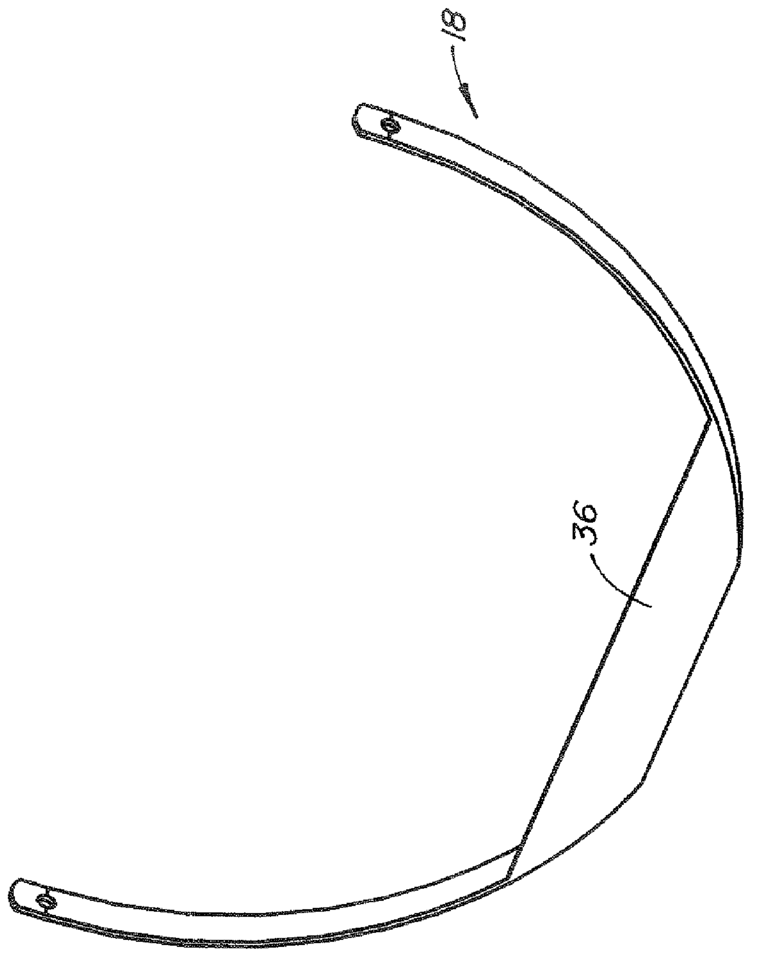

In the above described embodiments only one end of the spatula 18 is driven. However, as shown in FIG. 13, a drive shaft 76 could extend the between both ends of spatula 18 so that both ends of the curved spatula are driven by the spatula driver. FIG. 14 illustrates another version of spatula 18 configured to accommodate flat area 70.

Figure 15:
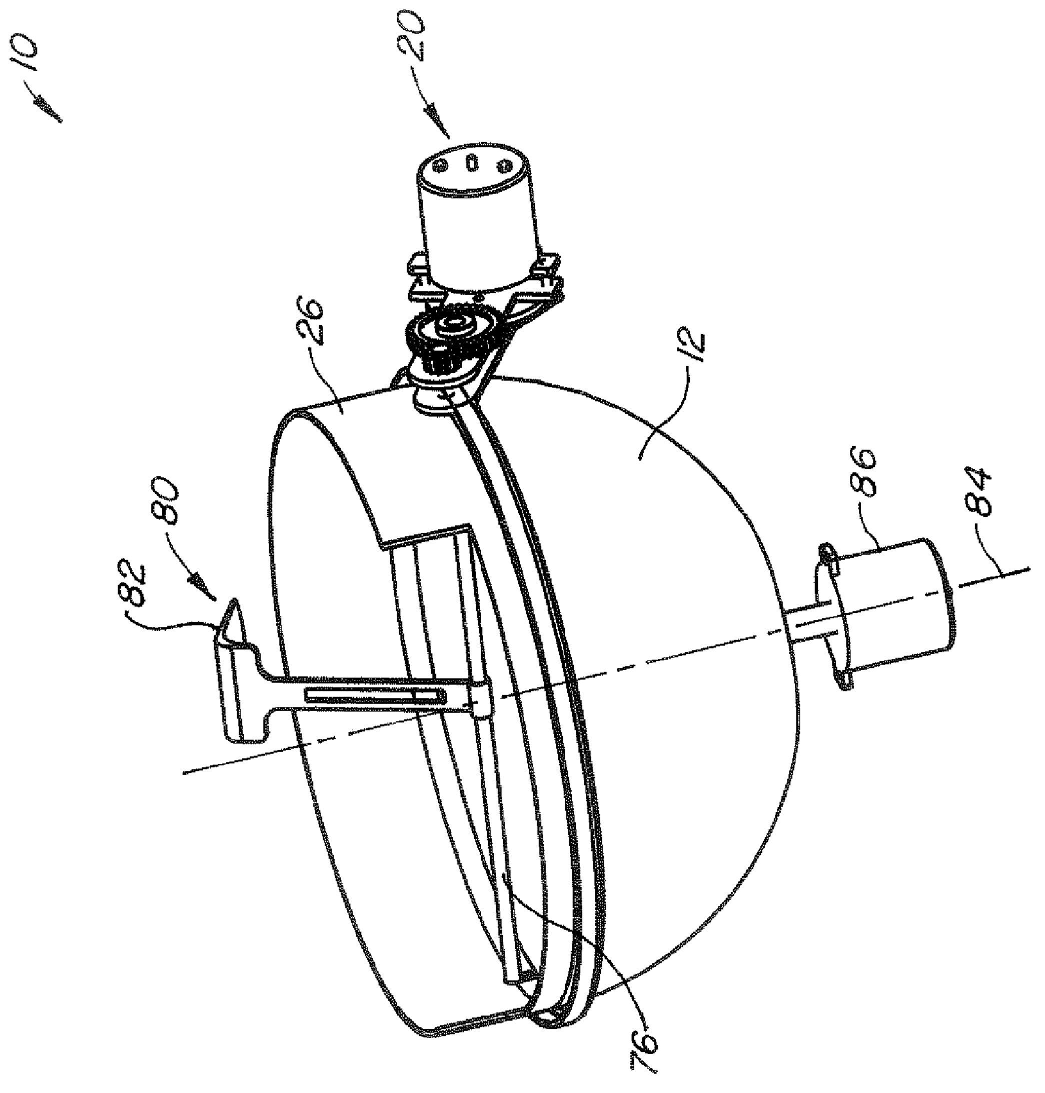
FIG. 15 illustrates an alternative embodiment of the invention in which the cooking apparatus uses a shovel-type spatula and the spatula and cooking container are rotated relative to one another.
Figure 16:
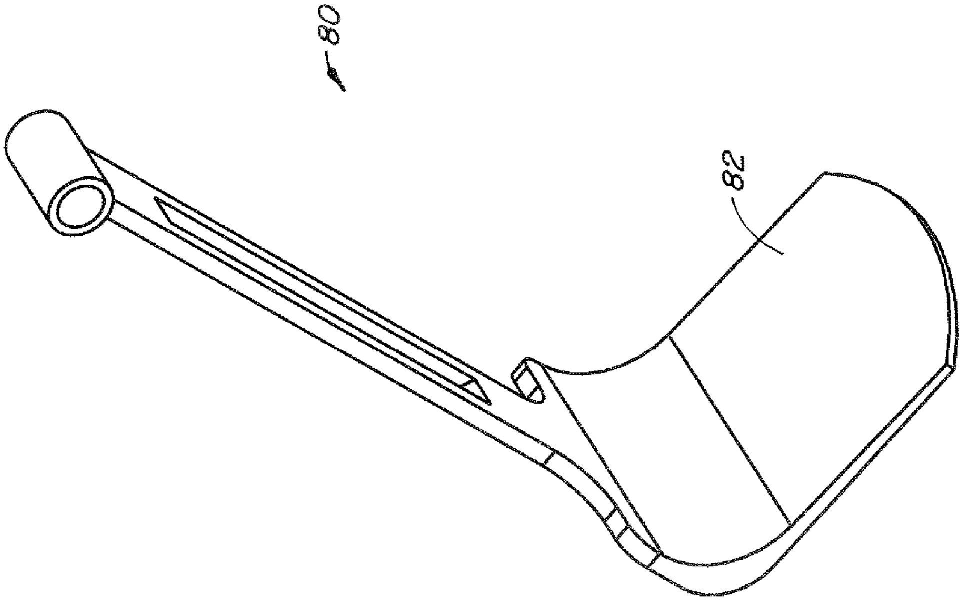
FIG. 16 is an enlarged view of the shovel-type spatula of FIG. 15.

A further embodiment is shown in FIGS. 15 and 16. In this embodiment a shovel-type spatula 80 is used to scrap inner surface 14 of cooking container 12. The scraping portion 82 may have an arc to conform to the spherical arc of the pot. In other embodiments, the scraping portion may be made of flexible, elastic material, such as steel or plastic, and may be flat and still conform or effectively conform to inner surface 14. If scraping portion 82 is of a flexible, elastic material, it can also be used for a slightly flat bottom cooking container 12. Because spatula 80 only scrapes a portion of the inner surface 14, either spatula 80 or cooking container 12 should rotate around the vertical axis 84 at the center of the cooking container 12. FIG. 15 illustrates the use of a cooking container rotator 86 which allows cooking container 12 to rotate about vertical axis 84 as spill ring 26, oscillating spatula driver 20, drive shaft 76, shovel-type spatula 82 and oscillating spatula driver 20 remain fixed. Alternatively, spatula driver 20 could be modified to cause spill ring 26, oscillating spatula driver 20, drive shaft 76, shovel-type spatula 82 and oscillating spatula driver 20 to rotate relative to cooking container 12 to create the same result.

Figure 17:
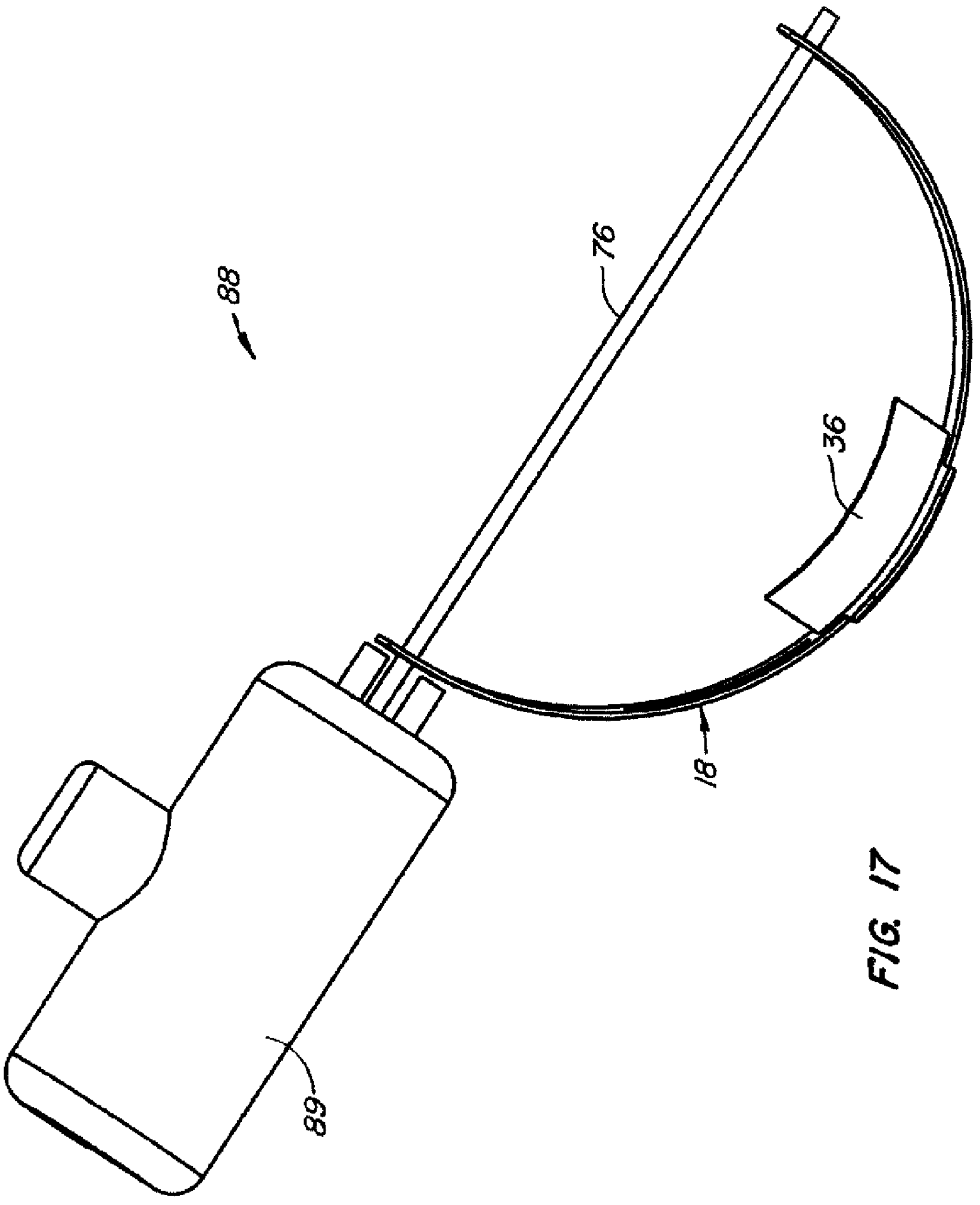
FIG. 17 is a view of a portable motorized spatula assembly.
Figure 18:
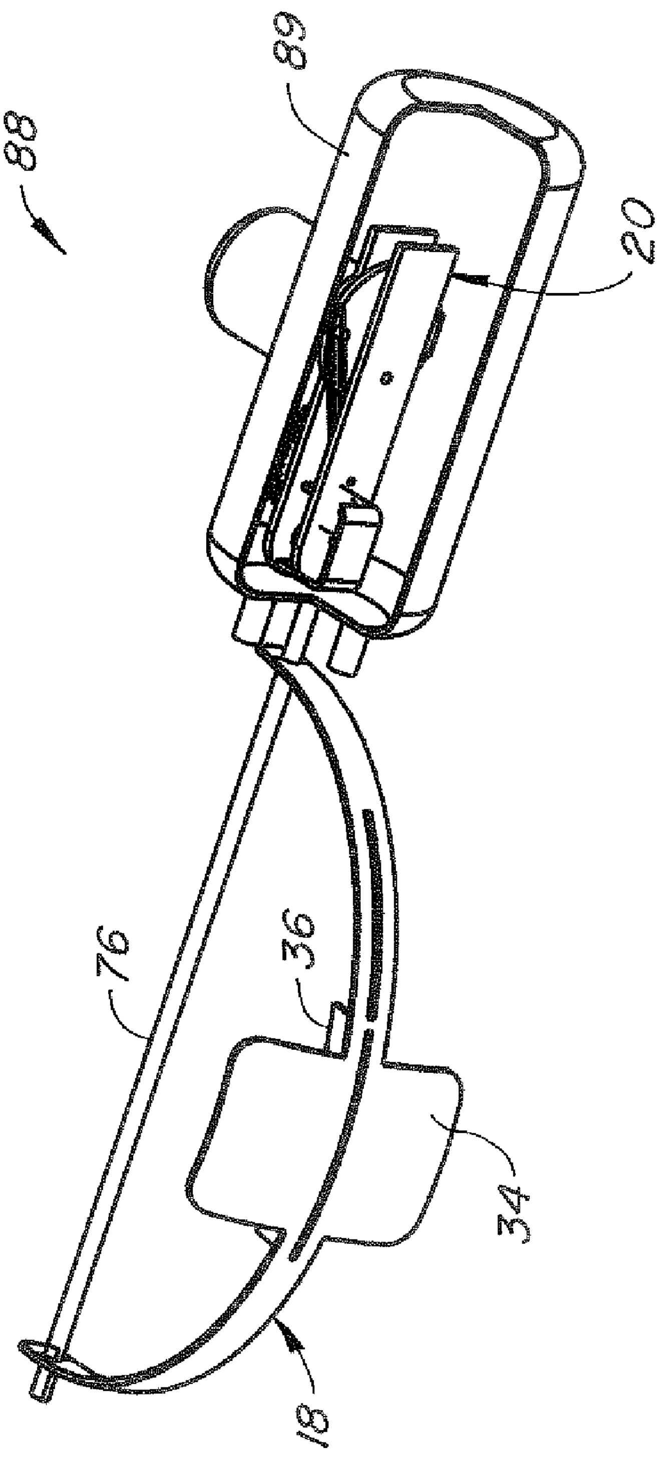
FIG. 18 is a view of the portable motorized spatula assembly of FIG. 17 with a portion of the housing broken away to illustrate the spatula driver.

The simplicity of the various embodiments of spatula 18 of assembly 16 allows spatula assembly 16 to be constructed as a portable device with, for example, a replaceable battery or a rechargeable battery. One such portable spatula assembly 88 is shown in FIGS. 17 and 18 and includes a housing 89 enclosing motorized spatula driver 20. When using portable spatula assembly 88, container 12 needs to be constructed so that spatula assembly 88 can be mounted thereto, such as by the use of receiving holes defining pivot axis 22. In addition, a fixture may be needed to prevent rotation of motorized spatula driver 20 relative to the cooking container during use. Portable spatulas may also be manually operated.

Figure 19:
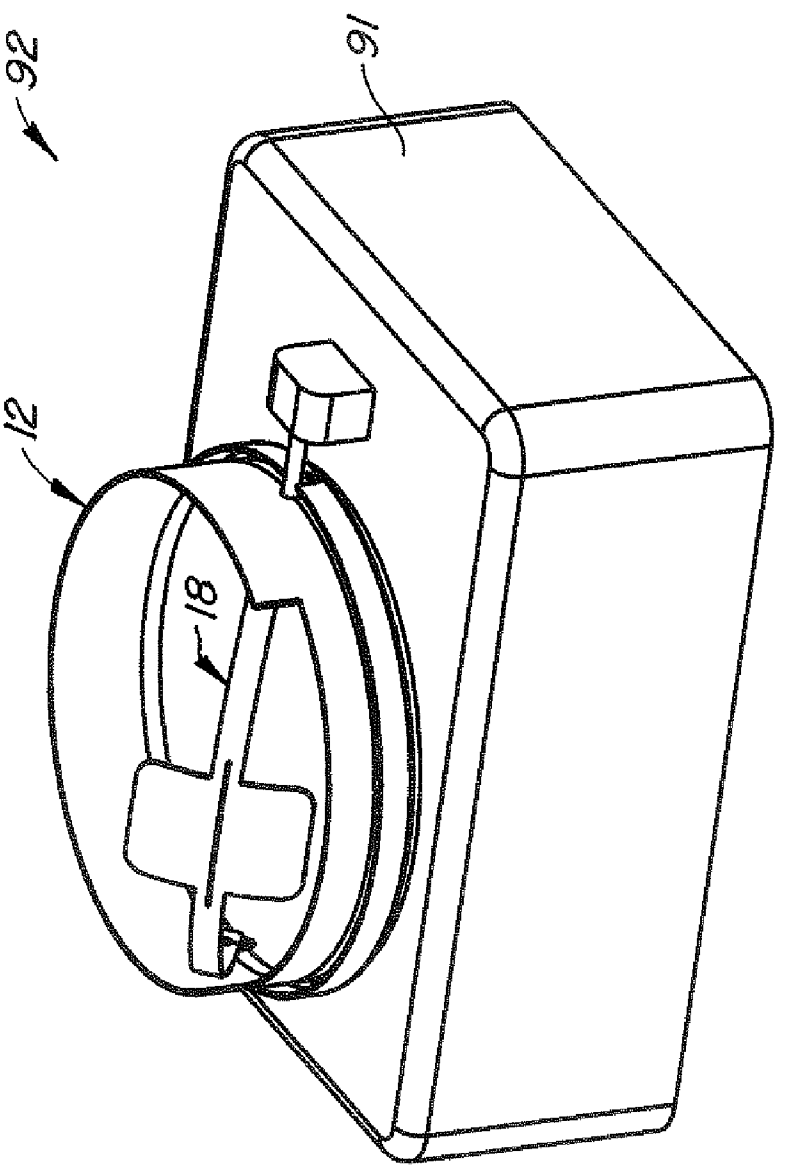
FIG. 19 illustrates a cooking assembly incorporating the cooking apparatus of FIG. 3 and a heat source along with electronic controls to provide automatic mixing and heating.
Figure 20:
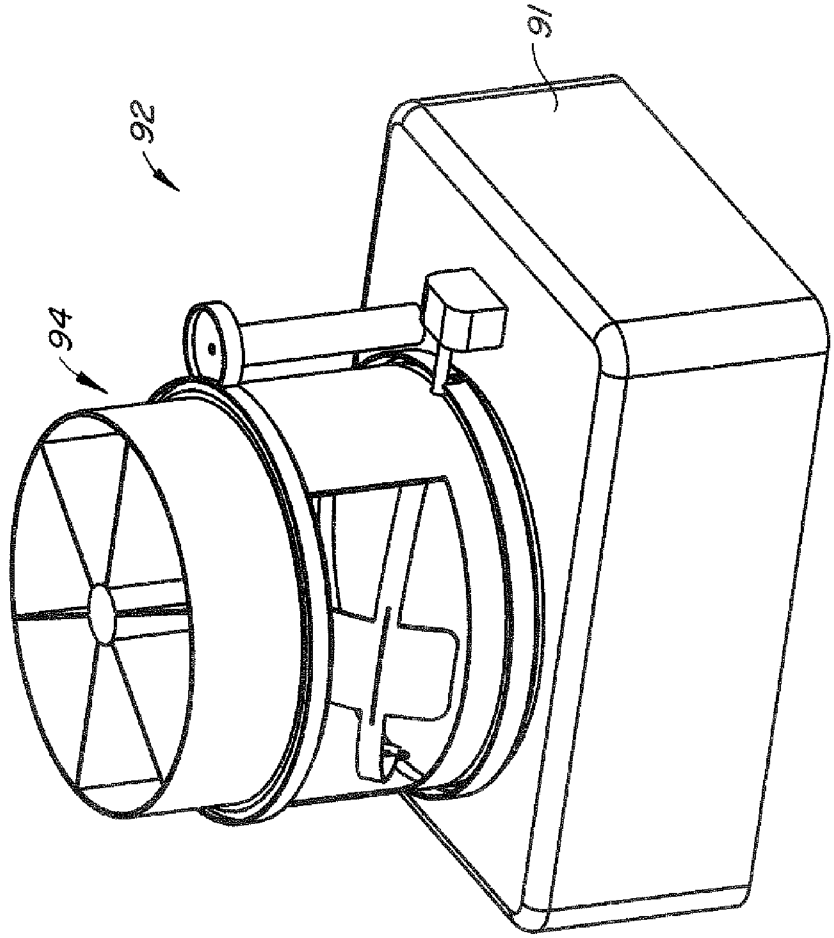
FIG. 20 shows a modification of the cooking assembly of FIG. 19 to include an automatic ingredient dispensing assembly.

Cooking apparatus 10 and heat source 30 can be incorporated into a cooking assembly 92, see FIG. 19, including a housing 91 with built-in electronics to provide automatic mixing and automatic heating control. In addition, FIG. 20 shows a cooking assembly 92 incorporating an automatic ingredient dispensing assembly 94 to create a low cost automated cooker. Structures and techniques for doing so has been fully disclosed in the above issued U.S. patents, the disclosures of which are incorporated by reference.

The effective length of the curved contacting section of spatula 18 can vary according to esthetic design and intended use of the spatula. The preferred configuration of spatula 18 is for the curved section of spatula 18 to sweep the maximum area of the entire inner surface 14 of cooking container 12. This will ensure the spatula will loosen any ingredients on the inner surface 14. Another advantage of a full arc sweeping spatula 18 is to create a maximum open space for ingredients to fall back into the cooking container without being caught by any structural supports of the curved spatula. Since cooking container 12 is preferably spherical and concave in nature, a curved spatula that can sweep at least 50% of the total height of the cooking container is adequate for most cooking. If the curved section of spatula 18 is short relative to the size of the pot, such as spatula example shown in FIG. 16, either the pot or the spatula assembly 16 has to rotated relative to each other to ensure a thorough flipping and mixing of ingredients.

Inner cooking surface 14 has an arc length between points located on opposite sides of the upper edge of the cooking surface. In the embodiment of FIG. 1, such an arc length can be measured between the points were pivot axis 22 intersects upper edge 24. Is preferred that spatula 18 also have an outer, circular spatula surface that moves along inner surface 14 during the pivotal movement of the spatula; the spatula surface preferably has a length at least 50%, and more preferably at least 75%, as long as the arc length.

In some embodiments the cooking apparatus can be adapted for use within a gas or electric oven or microwave oven. Other embodiments may be designed for other food preparation tasks such as mixing salad or food ingredients.

Cooking apparatus 10 helps ensure proper flipping and turning motion of ingredients without crushing, jamming and excessive pressure on the ingredients. Cooking apparatus 10 is easy to remove, install, clean and maintain, and the simplicity of the system makes it fit for mass production.

The above descriptions may have used terms such as above, below, top, bottom, over, under, et cetera. These terms are used to aid understanding of the invention are not used in a limiting sense. While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, a handle may be affixed or removable he mounted to the cooking container. More than one spatula 18 may be used with cooking apparatus 10.

Any and all patents, patent applications and printed publications referred to above are incorporated by reference.

What is claimed is:

1. A food flipping and turning food preparation apparatus comprising:

a food preparation container comprising an upper access opening and an inner, food preparation surface, the food preparation surface comprising a spheroid food preparation surface defining a center of curvature, the food preparation surface defining an open interior extending inwardly from the access opening;

the food preparation surface being a solid, liquid-containing surface; and a food flipping and turning spatula assembly comprising:

a curved spatula pivotally mounted to the food preparation container for moving along a circular path over the food preparation surface and about a pivot axis between first and second positions, the spatula having a length;

the curved spatula comprising a spatula body having an inwardly facing surface, and an outwardly facing surface, the outwardly facing surface comprising a curved spatula surface adjacent to the spheroid food preparation surface;

the curved spatula surface and the spheroid food preparation surface being like shaped surfaces;

the curved spatula comprising a barrier member extending inwardly of the inner surface of the spatula body transversely to the circular path;

the pivot axis passing through the center of curvature and oriented generally parallel to the access opening; and a spatula driver operably coupled to the spatula to drive the spatula along the circular path between the first and second positions.

2. The food preparation apparatus according to claim 1, wherein:

the spatula body has edges connecting the inwardly and outwardly facing surfaces, the curved spatula surface comprising a spheroid spatula surface extending to the edges; and the spheroid spatula surface and the spheroid food preparation surface being complementary shaped spheroid surfaces.

3. The food preparation apparatus according to claim 1, wherein the outwardly facing surface of the spatula body comprises a solid surface.

4. The food preparation apparatus according to claim 1, wherein the spatula body has a radial thickness, the outer surface having a circumferentially extending outer surface length and a transversely-extending outer surface width.

5. The food preparation apparatus according to claim 4, wherein the outer surface width is greater than the radial thickness.

6. The food preparation apparatus according to claim 4, wherein the outer surface length is greater than the outer surface width.

7. The food preparation apparatus according to claim 4, wherein the spheroid outer surface extends along the entire outer surface length.

8. The food preparation apparatus according to claim 1, wherein the spatula driver comprises an axle extending along the pivot axis, the axle connected to the spatula body at spaced apart positions along the axle.

9. The food preparation apparatus according to claim 1, wherein the spatula assembly is free of spatula assembly material along the pivot axis to define an open region along the pivot axis, whereby food can fall freely from the upper access opening of the cooking apparatus, past the pivot axis and into the open interior.

10. The food preparation apparatus according to claim 1, further comprising means for rotating at least one of the food preparation container and the spatula assembly relative to one another about a rotation axis, the rotation axis being perpendicular to the upper access opening.

11. The food preparation apparatus according to claim 1, wherein the barrier member comprises solid/liquid-separating drain holes so to aid separation of liquid and solid ingredients.

12. The food preparation apparatus according to claim 1, wherein a central portion of the spatula body comprises a circumferentially-extending wing member, the wing member having an outer wing member surface, the outer wing member surface and the spheroid food preparation surface being complementary shaped surfaces.

13. The food preparation apparatus according to claim 1, wherein the inner surface of the spatula body and the barrier member are oriented transverse to one another and define an ingredient collection region therebetween.

14. The food preparation apparatus according to claim 1, wherein:

the curved spatula is pivotally mounted to the food preparation container for reciprocal movement along the circular path; and the spatula driver is a reciprocating spatula driver to reciprocally drive the spatula along the circular path.

15. The food preparation apparatus according to claim 1, wherein the barrier member extends from the inner surface of the spatula body generally parallel to the spatula body and generally perpendicular to the circular path.

16. The food preparation apparatus according to claim 1, wherein the center of curvature is a centerline.

17. The food preparation apparatus according to claim 1, wherein the center of curvature is a center point and the spheroid food preparation surface is a spherical surface.

18. The food preparation apparatus according to claim 1, wherein the food preparation surface further comprises a central food preparation surface, said spheroid cooking surface surrounding the central food preparation surface.

19. The food preparation apparatus according to claim 18, wherein the central food preparation surface is flat.

20. The food preparation apparatus according to claim 1, wherein the food preparation container is a cooking container and the food preparation surface is a cooking surface.

21. The food preparation apparatus according to claim 1, wherein the curved spatula is pivotally mounted to the food preparation container for movement over the entire food preparation surface.

22. A food flipping and turning cooking apparatus comprising:

a cooking container comprising an upper access opening and an inner, cooking surface, the cooking surface comprising a spheroid cooking surface defining a center of curvature, the cooking surface defining an open interior extending inwardly from the access opening;

the cooking surface being a solid, liquid-containing surface; and a food flipping and turning spatula assembly comprising:

a curved spatula pivotally mounted to the cooking container for moving along a circular path over the cooking surface and about a pivot axis between first and second positions, the spatula having a length;

the curved spatula comprising a spatula body having an inner surface, an outer surface, and edges connecting the inner and outer surfaces, the outer surface comprising a spheroid spatula surface extending to the edges and positioned adjacent to the spheroid cooking surface;

the spheroid spatula surface and the spheroid cooking surface being complementary shaped surfaces;

the spatula body having a radial thickness, the outer surface having a circumferentially extending outer surface length and a transversely-extending outer surface width, the outer surface width being greater than the radial thickness;

the curved spatula comprising a barrier member extending from the inner surface of the spatula body transverse to the circular path;

the pivot axis passing through the center of curvature and oriented generally parallel to the access opening;

a spatula driver operably coupled to the spatula to drive the spatula along the circular path between the first and second positions; and the spatula assembly being free of spatula assembly material along the pivot axis to define an open region along the pivot axis, whereby food can fall freely from the upper access opening of the cooking apparatus, past the pivot axis and into the open interior.

23. The cooking apparatus according to claim 22, further comprising means for rotating at least one of the cooking container and the spatula assembly relative to one another about a rotation axis, the rotation axis being perpendicular to the upper access opening.

24. The cooking apparatus according to claim 22, wherein the barrier member comprises solid/liquid-separating drain holes so to aid separation of liquid and solid ingredients.

25. The cooking apparatus according to claim 22, wherein a central portion of the spatula body comprises a circumferentially-extending wing member, the wing member having an outer wing member surface, the outer wing member surface and the spheroid cooking surface being complementary shaped surfaces.

26. The cooking apparatus according to claim 22, wherein the inner surface of the spatula body and the barrier member are oriented transverse to one another and define an ingredient collection region therebetween.

27. The cooking apparatus according to claim 22, wherein:

the curved spatula is pivotally mounted to the cooking container for reciprocal movement along the circular path; and the spatula driver is a reciprocating spatula driver to reciprocally drive the spatula along the circular path.

28. The cooking apparatus according to claim 22, wherein the barrier member extends from the inner surface of the spatula body generally parallel to the spatula body and generally perpendicular to the circular path.

* * * * *